(12) United States Patent
Kremer-Davidson et al.

(10) Patent No.: US 11,188,193 B2
(45) Date of Patent: Nov. 30, 2021

(54) METHOD AND SYSTEM FOR GENERATING A PRIORITIZED LIST

(71) Applicant: International Business Machines Corporation, Armonk, NY (US)

(72) Inventors: Shiri Kremer-Davidson, Yavneel (IL); Anat Hashavit, Haifa (IL); Esther Goldbraich, Haifa (IL); Maya Barnea, Kiriat Bialik (IL); Oren Sar-Shalom, Nes Ziona (IL)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 15/811,714

(22) Filed: Nov. 14, 2017

(65) Prior Publication Data
US 2019/0146636 A1    May 16, 2019

(51) Int. Cl.
| | |
|---|---|
| *G06F 3/0482* | (2013.01) |
| *G06N 7/00* | (2006.01) |
| *G06F 3/0484* | (2013.01) |
| *G06Q 10/06* | (2012.01) |
| *G06Q 50/00* | (2012.01) |

(Continued)

(52) U.S. Cl.
CPC .......... *G06F 3/0482* (2013.01); *G06F 3/0484* (2013.01); *G06N 7/005* (2013.01); *G06Q 10/0631* (2013.01); *G06Q 50/01* (2013.01); *H04L 67/306* (2013.01); *G06Q 40/00* (2013.01);

(Continued)

(58) Field of Classification Search
CPC . G06F 3/0482; G06F 3/0484; G06Q 10/0631; G06Q 50/01; G06Q 40/00; H04L 67/306; H04L 41/5003; H04L 43/08; H04L 67/22; G06N 7/005; G06N 5/022; G06N 3/0445
See application file for complete search history.

(56) References Cited

U.S. PATENT DOCUMENTS

| | | |
|---|---|---|
| 9,152,920 B2 | 10/2015 | Bhatia et al. |
| 2007/0300174 A1 | 12/2007 | Macbeth et al. |

(Continued)

OTHER PUBLICATIONS

Stieglitz, Stefan, et al. "Social Media Analytics: [Social Media Analytics—An Interdisciplinary Approach and Its Implications for Information Systems]." Wirtschaftsinformatik 56.2 (2014): 101-109. (Year: 2014).*

(Continued)

*Primary Examiner* — Richard W. Crandall
*Assistant Examiner* — Corey Russ
(74) *Attorney, Agent, or Firm* — Jared C. Chaney

(57) ABSTRACT

The present invention provides a method, computer program product, and system of generating prioritized list. In an embodiment, the method, computer program product, and system include receiving, by a computer system, target user identification data identifying a target user, target action data, social network content for the one or more users, and social network activity data for the one or more users, analyzing, by a computer system, social network links between the source user and the target user and the social network activity data for the one or more users, determining, by a computer system, a prioritized list of probabilistic action paths that could result in the target user performing the target action on the content based on the analyzing, and outputting the prioritized list to the source user.

16 Claims, 9 Drawing Sheets

(51) Int. Cl.
*H04L 29/08* (2006.01)
*H04L 12/26* (2006.01)
*H04L 12/24* (2006.01)
*G06Q 40/00* (2012.01)

(52) U.S. Cl.
CPC .......... *H04L 41/5003* (2013.01); *H04L 43/08* (2013.01); *H04L 67/22* (2013.01)

(56) References Cited

U.S. PATENT DOCUMENTS

| | | | |
|---|---|---|---|
| 2008/0126277 A1* | 5/2008 | Williams | G16H 10/60 706/14 |
| 2012/0166532 A1* | 6/2012 | Juan | G06Q 50/01 709/204 |
| 2013/0054693 A1* | 2/2013 | Chennamadhavuni | G06Q 30/0269 709/204 |
| 2013/0073596 A1* | 3/2013 | Bai | H04L 69/329 707/827 |
| 2013/0124437 A1 | 5/2013 | Pennacchiotti et al. | |
| 2014/0088944 A1* | 3/2014 | Natarajan | G06F 30/20 703/13 |
| 2014/0156676 A1* | 6/2014 | Brust | G06F 16/24 707/748 |
| 2016/0125451 A1* | 5/2016 | Garg | G06Q 30/0243 705/14.42 |
| 2017/0061817 A1 | 3/2017 | Mettler May | |
| 2017/0140440 A1* | 5/2017 | Sripadham | G06Q 30/0277 |
| 2017/0185903 A1* | 6/2017 | Bernhardt | H04L 51/32 |
| 2018/0084078 A1* | 3/2018 | Yan | H04L 67/327 |
| 2018/0101774 A1* | 4/2018 | Werris | H04W 4/80 |
| 2018/0115622 A1* | 4/2018 | Zheng | H04L 67/06 |
| 2018/0139293 A1* | 5/2018 | Dimson | G06Q 30/02 |
| 2018/0174190 A1* | 6/2018 | Ferreira | G06Q 30/0246 |
| 2019/0138656 A1* | 5/2019 | Yang | G06F 16/9535 |
| 2020/0394366 A1* | 12/2020 | Miller | G10L 15/22 |
| 2021/0166532 A1* | 6/2021 | Takeda | G08B 6/00 |

OTHER PUBLICATIONS

Gurbanov, Tural, and Francesco Ricci. "Action prediction models for recommender systems based on collaborative filtering and sequence mining hybridization." Proceedings of the Symposium on Applied Computing. 2017. (Year: 2017).*

Gurbanov, Tural, Francesco Ricci, and Meinhard Ploner. "Modeling and predicting user actions in recommender systems." Proceedings of the 2016 Conference on User Modeling Adaptation and Personalization. 2016. (Year: 2016).*

Wang et al., "Community-based Greedy Algorithm for Mining Top-K Influential Nodes in Mobile Social Networks," KDD'10, Jul. 25-28, 2010, Washington, DC, Copyright 2010 ACM, 10 pages https://pdfs.semanticscholar.org/4f4e/1fab4ae110423e0c1236fcf5ffd35a2845fb.pdf.

Kempe et al., "Maximizing the spread of influence through a social network," KDD '03 Proceedings of the ninth ACM SIGKDD international conference on Knowledge discovery and data mining, Aug. 24-27, 2003, Washington, DC, Copyright 2003 ACM, 10 pages.

Mell et al., "The NIST Definition of Cloud Computing," Recommendations of the National Institute of Standards and Technology, US Department of Commerce, NIST Special Publication 800-145, Sep. 2011, 7 pages.

Leiba et al., "Personalized Social Media Actions Based on Eminence Traits," U.S. Appl. No. 15/398,035, filed Jan. 4, 2017.

* cited by examiner

METHOD AND SYSTEM FOR GENERATING A PRIORITIZED LIST

BACKGROUND

The present disclosure relates to social networks, and more specifically, to generating predicted reactions of a user.

Social networks are websites where multiple users can share, react, and respond to user uploaded information. Social networks are becoming increasingly prevalent in everyday user.

SUMMARY

The present invention provides a method, computer program product, and system of generating predicted reactions of a user. In an embodiment, the method, computer program product, and system include receiving, by a computer system, target user identification data identifying a target user, target action data, social network content for the one or more users, and social network activity data for the one or more users, analyzing, by a computer system, social network links between a source user and the target user and the social network activity data for the one or more users, determining, by a computer system, a prioritized list of probabilistic action paths that could result in the target user performing the target action on the content based on the analyzing, and outputting the prioritized list to the source user.

DETAILED DESCRIPTION

Figure 1:
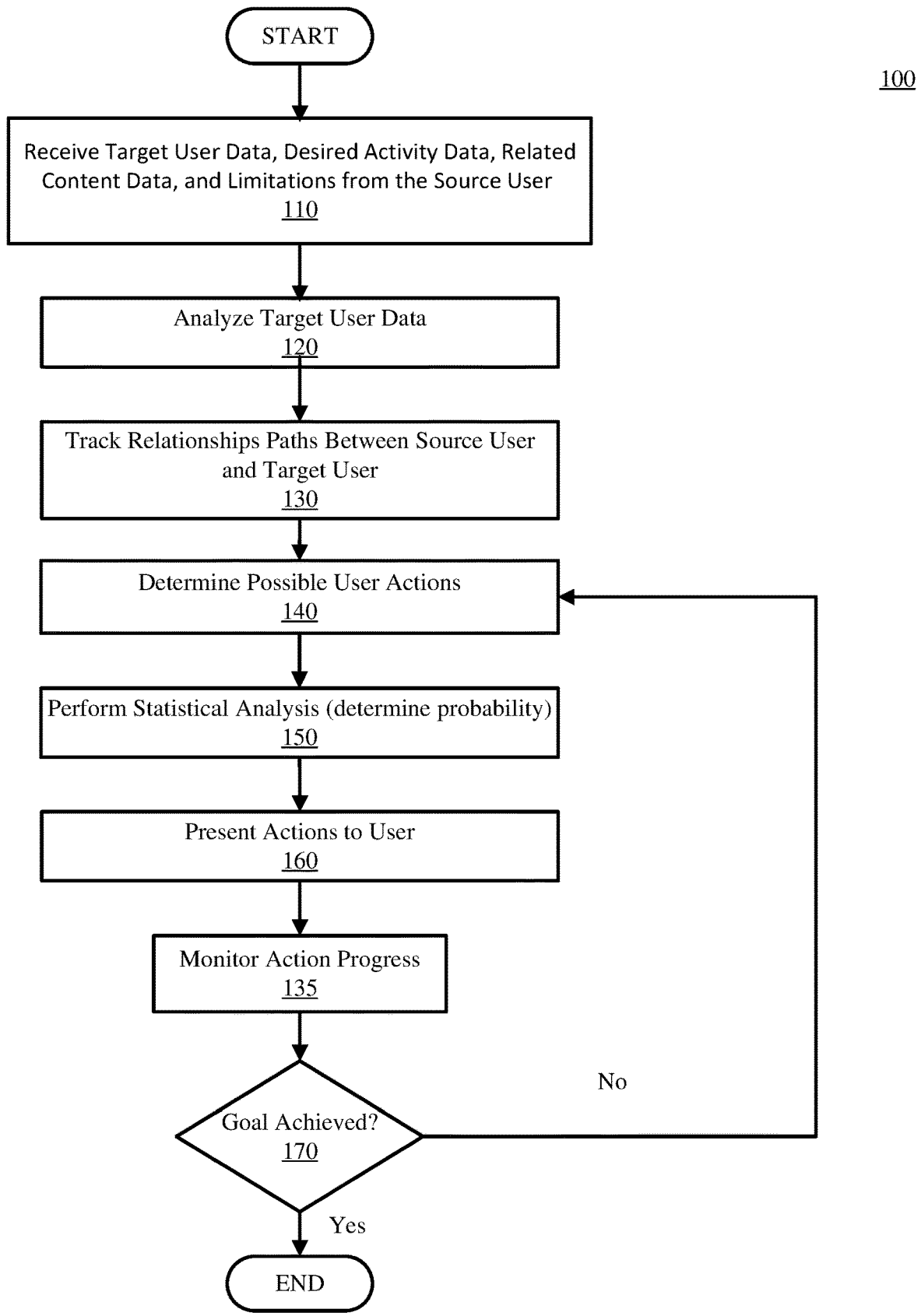
FIG. 1 depicts a flow diagram in accordance with an exemplary embodiment of the present invention.

The present invention provides a method, computer program product, and system of generating predicted reactions of a user. In an embodiment, the method, computer program product, and system include receiving, by a computer system, target user identification data identifying a target user, target action data, social network content for the one or more users, and social network activity data for the one or more users, analyzing, by a computer system, social network links between a source user and the target user and the social network activity data for the one or more users, determining, by a computer system, a prioritized list of probabilistic action paths that could result in the target user performing the target action on the content based on the analyzing, and outputting the prioritized list to the source user. In an embodiment, the target action data contains data linked to the target action. In an embodiment, the source user is a user that provided the target action.

In an embodiment, the method, computer program product, and system further include monitoring, by the computer system, a status of a selected action path, and reporting, by the computer system, the status of the selected action path.

In an embodiment, the method, computer program product, and system further include based on the monitoring, determining, by the computer system, an updated prioritized list of probabilistic action paths that could result in the target user performing the target action on the content based on the analyzing and the receiving, and outputting the updated prioritized list to the source user via a screen logically connected to the computer system.

Today, users are using social network systems for a variety of purposes including widening their influence across a company, pushing their posted content, and reaching new levels in the company's hierarchy. Users need to be able to draw specific people to read and engage with content the users place. Users may feel uncomfortable approaching specific people directly (e.g. messaging or posting on the targets social network homepage) and the user may want to see how they can achieve their goal by other means.

In an embodiment, a reaction solicitor employs a method of assisting users in choosing what series of actions to perform in order to raise the probability that another specific user (i.e., target user) will react to their content. In an embodiment, the reaction solicitor creates a list of possible actions to solicit a response from a target user. In an embodiment, the list is prioritized by probability of success and/or expected path length. Probability of success is the likelihood that the target user will perform a target action (e.g., liking a post, sharing a post, etc.). In an embodiment, a confidence value is computed for each action in the list based on the likelihood of success. In an embodiment, the list is sorted according to a combination of the above to reflect user/system preference. In an embodiment, the method, system, and computer program product further includes assigning, by the computer system, a probability value for each action path in the prioritized list.

In an embodiment, users can introduce constrains on the reaction solicitor that are applied as path filters along the way. For example, the constraints could provide a maximum number of steps, exclude/include certain network contacts, or provide a desired time frame to achieve the goal (e.g. 2 days).

In an embodiment, the reaction solicitor uses one or more social network systems to provide users a reaction planning and managing facility through which users can gain much more control on spreading their contents to one or more desired targets and soliciting a response from the one or more target users. In an embodiment, the reaction solicitor allows users to define a set of reactions they want from the one or more target users regarding their content. In an embodiment, the reaction solicitor visually displays a prioritized list of action sequences with highest probability of reaching a goal (target reaction) and then follow, in real time, each selected path progress. In an embodiment, probability is determined by any factor that has been determined to affect probability in similar scenarios. For example, probability could be determined by proximity between (i.e., number of contacts between) an originating user and a target user, the target user's response to a previous action sequence, and/or the relationship between the originating user and the target user. In an embodiment, the receiving further comprises receiving target action time data identifying a target action time. In an embodiment, the outputting comprises displaying the prioritized list to the user via a display logically connected to the computer system.

In an embodiment, the reaction solicitor monitors and logs a target user in order to infer behavioral models. In an embodiment, the reaction solicitor combines other user's behavioral models to create sequences of possible actions by the other users.

In an embodiment, the reaction solicitor monitors the feedback of any actions and determines the likelihood of success. If the likelihood of success is low (e.g., less than 50%), the reaction solicitor can terminate the action. For example, the reaction solicitor computes a projected path length of the action continually (i.e., the number of users the action must go through to reach the target user). If any factors emerge that dramatically increase the projected path length (an indicator of success probability), the reaction solicitor can allow "early termination" of the action. In an embodiment, early termination would be the undoing of the action. For example, early termination could mean taking a post off of a user's wall, un-tagging a user, or deleting content. In an embodiment, the prioritized list is prioritized by at least one of minimal path length probability, strength of network connection, and history of similar actions by the target user.

Referring now to FIG. 1, illustrated is a block diagram of the example method 100, in accordance with embodiments of the present disclosure. The method 100 includes one or more operations to reach its goal (e.g., having the target user perform an action relating to the originating users content). In an embodiment, the method 100 includes an operation 110 of receiving data relating to achieving the goal, an operation 120 of analyzing target user data, and an operation 130 of tracking relationship paths between a source user and the target user. Based on at least operation 110, in an embodiment, the method 100 includes an operation 140 of determining possible user actions, an operation 150 of performing statistical analysis on one or more of the possible user actions to determine the probability of success for the one or more possible user actions, and an operation 160 of presenting actions to the originating user. After the originating user performs one of the actions presented (or any other action), the method 110 includes a monitoring operation 170 to determine if the goal is achieved. In an embodiment, if the goal is achieved the method will end. Method 100 includes operation 135 of motoring the action progress and/or repeating one or more of the operations (for example operation 140, operation 150, and operation 160) before repeating operation 170 to determine if the goal has been achieved. In an embodiment, the originating user changes the action during the method. For example, the reaction solicitor could suggest a new action if it is determined that the first action chosen by the originating user is no longer the most likely to achieve the desired result from the target user. Operation 135 could be performed at any time and before or after any other operation.

In an embodiment, operation 110 includes receiving any information relating to the content the originating user wants the target user to perform an action on. For example, the data could include any feature of the content, such as subject matter, language, length, type (e.g., blog, status update, video, or picture). In an embodiment, operation 110 includes receiving any information relating to the target user. For example, how often the target user performs an action, what type of content the target user performs the action on, etc. In an embodiment, operation 110 includes receiving any information relating to network connections between the target user and the originating user. For example, the information could include network path length, user relationships, frequency of contact between users, etc. In an embodiment, operation 110 includes receiving any information relating to a goal of the originating user. For example, the data could be target user data, desired activity data, related content data, and/or limitations from the source user (e.g., achieve goal in three days or go through no more than two mutual contacts). In and embodiment, social network activity data includes social activity historical data for one or more users. For example, the social network activity data could be the historical (or past) activity of the target user and what actions the target user has responded to.

In an embodiment, operation 120 includes any analysis that determines what the likelihood of a given reaction is in resulting in a given goal. For example, operation 120 could include how often a target user likes a given content shared by a user that is a mutual connection of both the originating user and the target user.

In an embodiment, operation 130 includes information relating to network paths between the originating user and the target user. For example, it could be network length, strength of the connections in the path, or activity of the users in the path.

In an embodiment, operation 140 of determining possible user action relates to determining any actions that might result in the goal the originating user put forth or a similar goal. For example, the originating user may want the target user to share the content. However, if the target user never shares content a path to the target user liking content could be suggested.

In an embodiment, operation 150 includes factors that relate to achieving the goal. For example, it could include information not only on path length (number of users between originating user and target user), but also activity of each user in the path.

In an embodiment, operation 160 includes any method of presenting the possible actions to the user. For example, the presenting could be graphical based, audio based, touch based, etc.

Figure 2:
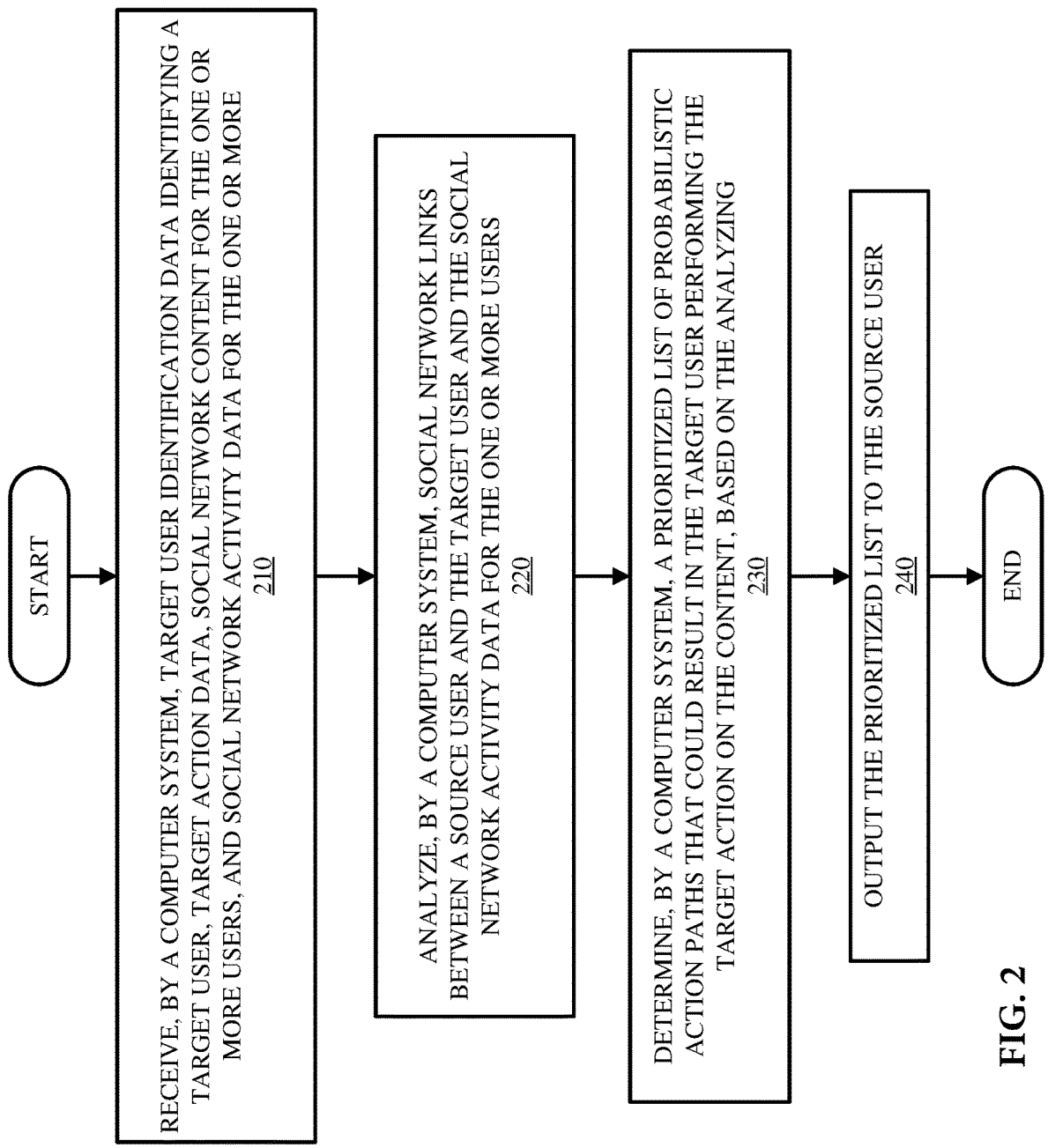
FIG. 2 depicts a flow diagram in accordance with an exemplary embodiment of the present invention.

Referring to FIG. 2, in an embodiment, the method includes an operation 210 of receiving, by a computer system, target user identification data identifying a target user, target action data, social network content for the one or more users, and social network activity data for the one or more users, an operation 220 of analyzing, by a computer system, social network links between the source user and the target user and the social network activity data for the one or more users, an operation 230 of determining, by a computer system, a prioritized list of probabilistic action paths that could result in the target user performing the target action on the content based on the analyzing, and an operation 240 of outputting the prioritized list to the source user. In an embodiment, one or more of the action paths is comprised of multiple actions by the source user.

Figure 3:
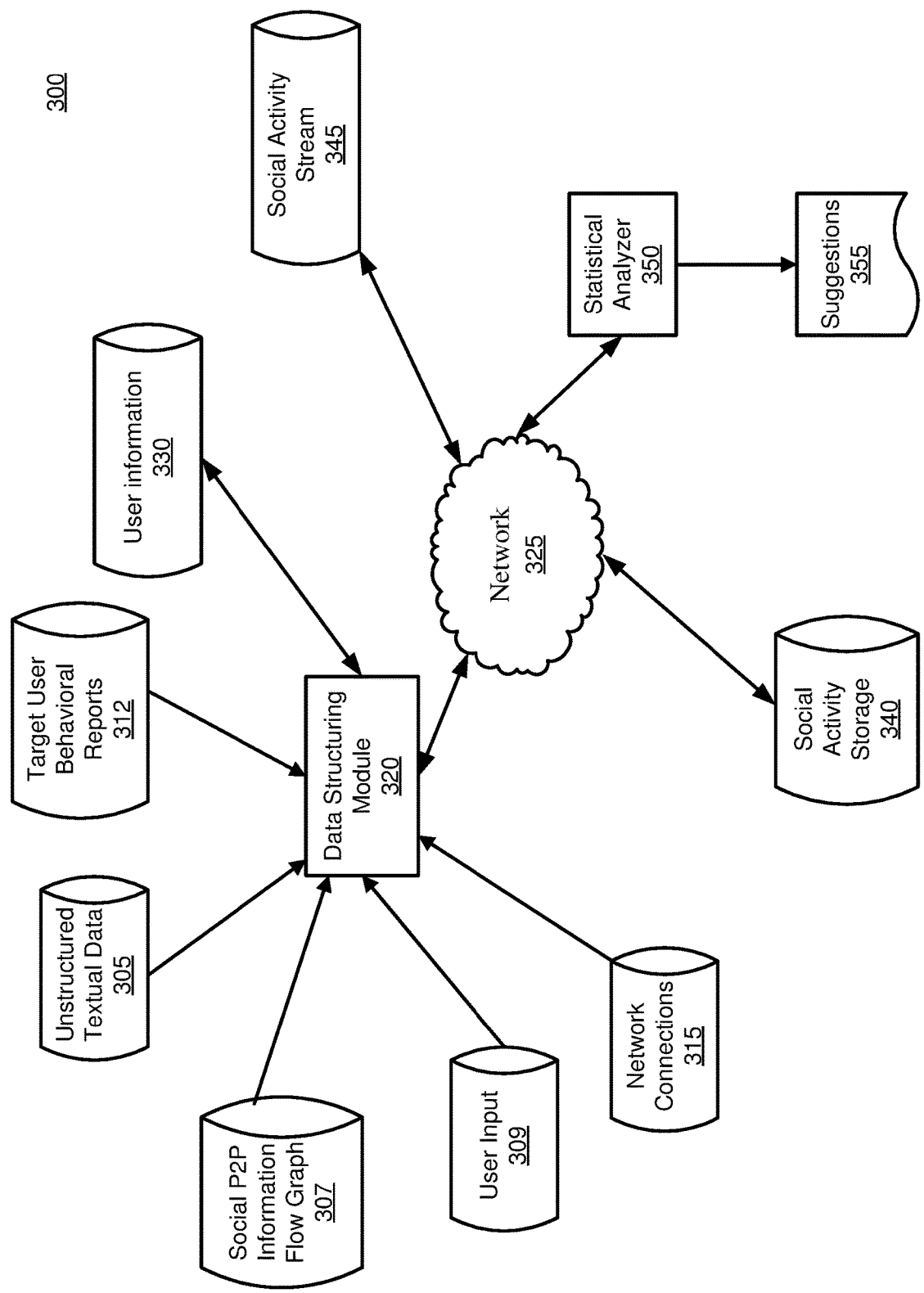
FIG. 3 depicts a block diagram in accordance with an exemplary embodiment of the present invention.

In an embodiment, referring to FIG. 3, an example network environment 300 includes a plurality of data sources, such as a source of unstructured textual data 305, target user behavioral reports 312, user input 309, social peer to peer (P2P) information flow graph 307, network connections 315, user information 330, social activity storage 340, and social activity stream 345. In an embodiment, the data sources (e.g., unstructured textual data 305, target user behavioral reports 312, user input 309, social P2P information flow graph 307, network connections 315, user information 330, social activity storage 340, and social activity stream 345) resides in the storage of a single device, or is distributed across the storage of a plurality of devices. Data collected from the data sources includes historical data (e.g., data corresponding to previous action selections). In an embodiment, a single type of data (e.g., social activity storage 340) resides in the storage of a single device, or resides in the storage of several devices connected either locally or remotely via a network, such as a network 325. In an embodiment, the data sources and other devices connected to network 325 are local to each other, and communicate via any appropriate local communication medium.

In an embodiment, data structuring module 320 includes, or is a part of, a device for converting unstructured, raw data (e.g., textual data, images, videos, sound recordings, etc.) into structured data (e.g., machine-readable data) that a computer system utilizes. In an embodiment, user information 330 includes data relevant to the social network and activity of a user. For example, user information 330 could be a list of friends or contacts, number of likes/week, number of shares/week, or number of postings/week.

In an embodiment, social activity storage 340 includes any historical data regarding social network application. For example, social activity storage 340 includes action information for a history information for a particular user, history information for a group of users, average number of actions by a user or group of users, average number of actions for the social network platform, etc.

In an embodiment, social activity stream 345 includes data collected from or about social activity on the platform (e.g., social network program, blogging program, etc.). For example, social activity stream could include specifications average number of interactions for a user with other users in the user's network.

In an embodiment, the various data sources, the data structuring module 320 and a statistical analyzer 350 are connected via network 325. The network 325 can be implemented using any number of any suitable communications media. For example, the network 325 could be a wide area network (WAN), a local area network (LAN), an internet, or an intranet. For example, the data structuring module 320 and statistical analyzer 350 and one or more data sources could communicate using a local area network (LAN), one or more hardwire connections, a wireless link or router, or an intranet. In an embodiment, the data structuring module 320, statistical analyzer 350, and/or one or more data sources are communicatively coupled using a combination of one or more networks and/or one or more local connections. For example, the data structuring module 320 is hardwired to the statistical analyzer 350 (e.g., connected with an Ethernet cable) while the data sources could communicate with the data structuring module 320 and statistical analyzer 350 using the network 325 (e.g., over the Internet).

In an embodiment, the network 325 can be implemented within a cloud computing environment, or using one or more cloud computing services. Consistent with various embodiments, a cloud computing environment includes a network-based, distributed data processing system that provides one or more cloud computing services. Further, a cloud computing environment includes many computers (e.g., hundreds or thousands of computers or more) located within one or more data centers and configured to share resources over the network 325.

In an embodiment, data structuring module 320 and/or statistical analyzer 350 employs "crawlers" or "scrapers" to access the various social network and social media data sources to mine relevant data (such as historical target user information) at particular intervals, or in real-time. Crawlers/scrapers are configured to "patrol" in search of relevant data (e.g., unstructured textual data 305, target user behavioral reports 312, user input 309, social P2P information flow graph 307, network connections 315, user information 330, social activity storage 340, social activity stream 345, etc.) from social media streams or in the data sources, such as target user behavioral reports 312, user input 309, social P2P information flow graph 307, network connections 315, user information 330, social activity storage 340, and social activity stream 345. For example, a crawler is configured to identify and retrieve information on the target user, to identify and retrieve information on the actions of the target user, to identify and retrieve user records for a particular demographic or a particular individual, etc. In an embodiment, a crawler is configured to "crawl" through a database or data source at a given interval, and/or to retrieve documents that have been updated or modified subsequent to a previous retrieval. For example, a user may have recently started sharing articles from technology related sources where before (e.g., prior to six months ago) the user only shared articles from political sources. A document fitting the crawler's parameters is retrieved, and if needed, analyzed and converted from an unstructured state into a structured state via data structuring module 320.

In an embodiment, structured data is said to contain sets of features (e.g., events, preceding, attributes, characteristics, etc.) of the user or user interaction/performance within the user's network. The data from each data source is said to contain a single feature set. For example, the data from the source containing target user behavioral reports is a first feature set, the data from the source containing social activity stream 345 is a second feature set, and so on. Once the feature set from each available data source is collected, it is combined to create a complete feature set.

In an embodiment, a complete feature set (e.g., a set of all features related to an action or target user) is utilized by statistical analyzer 350, using the methods described herein (e.g., k-means clustering), to determine correlations between features (e.g., characteristics, target user, network path length, etc.) of a particular action (e.g., requirement, malfunctioning components, etc.) and possible solutions. For example, statistical analyzer 350 could identify that a particular action or action variation has a network path length that is too long. Possible solutions could include directing the user to a new action, abandoning the action, etc. In an embodiment, k-means clustering aims to partition n observations into k clusters in which each observation belongs to the cluster with the nearest mean, serving as a prototype of the cluster.

In an embodiment, statistical analyzer 350 generates suggestions 355 for actions. In an embodiment, suggestions 355 are generated by considering all data relevant to the action or a user profile (e.g., target user, originating user, user in the network, etc.) that correlate to goal completion. Particular features within the suggestions 355 are weighted. For example, an action through a new network contact could be less likely to produce the desired result than an action through an established or long-time network contact. In one example, tagging a new hire might not get the manager of the new hire to like the post, but tagging an employee that has been under the manager for 20 years may get the manager to like the post.

Figure 4:
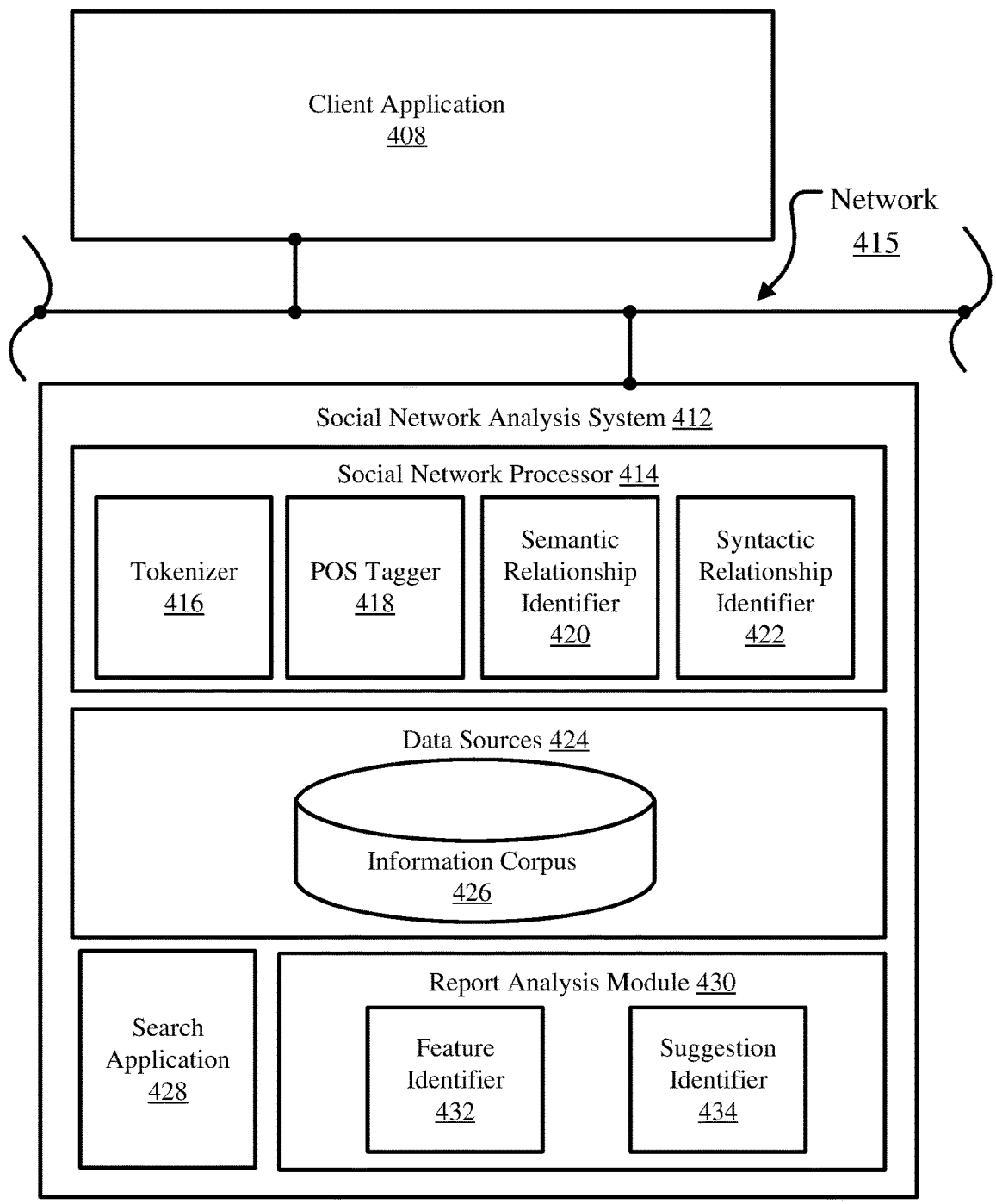
FIG. 4 depicts a block diagram in accordance with an exemplary embodiment of the present invention.

Referring to FIG. 4, in an embodiment, illustrated is a block diagram of an example social network analysis system 400 configured to analyze social network connections, actions a user of the social network, possible actions by an originating user, or any other report with unstructured data, in accordance with embodiments of the present disclosure.

In an embodiment, a remote device (such as a device containing one or more of the data sources described in FIG. 3) submits electronic documents (such as textual target user behavioral reports, or other unstructured textual reports) to be analyzed to a social network analysis system 412 which is a standalone device, or part of a larger computer system. In an embodiment, social network analysis system 412 includes a client application 408, which itself involves one or more entities operable to generate or modify information in the unstructured textual report(s) that is then dispatched to social network analysis system 412 via a network 415, which in some embodiments is consistent with network 325.

In an embodiment, social network analysis system 412 responds to electronic document submissions sent by client application 408.

Likewise, in an embodiment, social network analysis system 412 analyzes a received unstructured textual report relating to the target user. If a target user is not provided to client application 408, a skill of a user could be determined using social network analysis system 412 to analyze information relating to the user's technical skill. For example, social network analysis system 412 could analyze a received unstructured textual report including the user's education, action play experience, application use experience, etc. to determine a relative skill level.

In an embodiment, social network analysis system 412 includes a social network processor 414, data sources 424, a search application 428, and a report analysis module 430. Social network processor 414 is a computer module that analyzes the received unstructured reports (text or graphical) and other electronic documents. In an embodiment, social network processor 414 performs various methods and techniques for analyzing (e.g., syntactic analysis, semantic analysis, etc.) electronic documents. Social network processor 414 is configured to recognize and analyze social network data (news feeds, posts, likes, shares, etc.). In an embodiment, social network processor 414 parses information of the documents. Further, social network processor 414 includes various modules to perform analyses of electronic documents. These modules include, but are not limited to, a tokenizer 416, a part-of-speech (POS) tagger 418, a semantic relationship identifier 420, and a syntactic relationship identifier 422.

In an embodiment, tokenizer 416 is a computer module that performs lexical analysis. In an embodiment, tokenizer 416 converts a sequence of characters into a sequence of tokens. A token is a string of characters included in an electronic document and categorized as a meaningful symbol. In an embodiment, the tokens can identify users or user actions. For example, the sequence of characters could be "Mark liked Jennifer's post." The tokenizer 416 could then pars the data into three tokens, a first token of "Mark", a second token of "liked", and a third token of "Jennifer." Further, in an embodiment, tokenizer 416 identifies word boundaries in an electronic document and breaks any text passages within the document into their component text elements, such as words, multiword tokens, numbers (e.g., 12 likes), and punctuation marks. In an embodiment, tokenizer 416 receives a string of characters, identify the lexemes in the string, and categorizes them into tokens.

In an embodiment, POS tagger 418 is a computer module that marks up a word in passages to correspond to a particular meaning for social network (e.g., like, share, reaction, etc.). In an embodiment, POS tagger 418 reads a passage or other text in natural language and assigns a part of speech to each word or other token. In an embodiment, POS tagger 418 determines the part of speech to which a word (or other text element) corresponds, based on the definition of the word and the context of the word. The context of a word is based on its relationship with adjacent and related words in a phrase, sentence, or paragraph. In an embodiment, the context of a word is dependent on one or more previously analyzed electronic documents. In an embodiment, the output of social network analysis system 412 populates a text index, a triple store, or a relational database to enhance the contextual interpretation of a word or term. Examples of parts of speech that is assigned to words include, but are not limited to, nouns, verbs, adjectives, adverbs, and the like. Examples of other part of speech categories that POS tagger 418 could assign include, but are not limited to, comparative or superlative adverbs, wh-adverbs, conjunctions, determiners, negative particles, possessive markers, prepositions, wh-pronouns, and the like. In an embodiment, POS tagger 418 tags or otherwise annotates tokens of a passage with part of speech categories. In an embodiment, POS tagger 418 tags tokens or words of a passage to be parsed by social network analysis system 412.

In an embodiment, semantic relationship identifier 420 is a computer module that is configured to identify semantic relationships of recognized text elements (e.g., words, phrases) in documents. In an embodiment, semantic relationship identifier 420 determines functional dependencies between entities and other semantic relationships.

Consistent with various embodiments, the syntactic relationship identifier 422 is a computer module that is configured to identify syntactic relationships in a passage composed of tokens. In an embodiment, the syntactic relationship identifier 422 determines the grammatical structure of sentences. For example, which groups of words are associated as phrases and which word is the subject or object of a verb. In an embodiment, the syntactic relationship identifier 422 conforms to formal grammar.

In an embodiment, social network processor 414 is a computer module that parses a document and generates corresponding data structures for one or more portions of the document. For example, in response to receiving an unstructured textual report at social network analysis system 412, social network processor 414 could output parsed text elements from the report as data structures. In an embodiment, a parsed text element is represented in the form of a parse tree or other graph structure. To generate the parsed text element, social network processor 414 triggers computer modules 416-422.

In an embodiment, the output of social network processor 414 is used by search application 428 to perform a search of a set of (i.e., one or more) corpora to retrieve one or more features (e.g., social network labels such as likes, shares, or reactions), or sets of features, and one or more associated criteria to send to an image processing system and to a comparator. For example, digital image icons, such as emojis, could indicate a reaction to a social media post on a social network. A comparator is, for example, a statistical analyzer, such as statistical analyzer 350 of FIG. 3. In an embodiment, as used herein, a corpus refers to one or more data sources, such as data sources 424 of FIG. 4, or the various data sources described in FIG. 3. In an embodiment, data sources 424 includes data warehouses, information corpora, data models, and document repositories. In an embodiment, data sources 424 include an information corpus 426. In an embodiment, information corpus 426 enables data storage and retrieval. In an embodiment, information corpus 426 is a storage mechanism that houses a standardized, consistent, clean, and integrated list of features. In an embodiment, information corpus 426 also stores, for each feature, a list of associated suggestions. For example, information corpus 426 includes the types of social network action (e.g., like, hate, share, etc.) and for each type of desired target user action, associated suggestions (e.g., tag Mark, share on Marks wall, etc.) is listed. Data is sourced from various operational systems. Data stored in information corpus 426 is structured in a way to specifically address reporting and analytic requirements. In an embodiment, information corpus 426 is a data repository, a relational database, triple store, or text index. In an embodiment, the report analysis module 430 is a computer module that identifies a feature and a suggestion by analyzing one or more unstructured textual reports (e.g., a target user has shared 30 of Mark's texts). In an embodiment, report analysis module 430 includes a feature identifier 432 and a suggestion identifier 434. When an unstructured textual report is received by social network analysis system 412, report analysis module 430 is configured to analyze a report using natural language processing, or any other cognitive learning system, to identify one or more features. In an embodiment, report analysis module 430 first parses the report using social network processor 414 and related subcomponents 416-422. After parsing the report, the feature identifier 432 identifies one or more features present in the report. This is done by, e.g., searching a dictionary (e.g., information corpus 426) using search application 428. In an embodiment, once a feature is identified, feature identifier 432 is configured to transmit the feature to an image processing system and/or to a statistical analyzer.

In an embodiment, suggestion identifier 434 identifies one or more suggestions (e.g., action suggestions) in one or more unstructured textual reports. This is done by using search application 428 to comb through the various data sources (e.g., information corpus 426 or the data sources discussed in FIG. 3) for information and/or reports regarding various action categories (e.g., target user shares 90% of posts Mark has been tagged in, etc.) associated with a particular action. In an embodiment, the list of possible suggestions is predetermined and information related to the list of suggestions is populated as suggestion information is retrieved. In an embodiment, suggestion identifier 434 searches, using a machine learning process reports from the various data sources for terms in the list of suggestions. After identifying a list of suggestions, suggestion identifier 434 is configured to transmit the list of suggestions to a statistical analyzer. For example, suggestion identifier 434 could use the following cognitive analytic techniques alone or in conjunction with others: natural language processing (NLP), relationship extraction, tone analyzer, and speech to text. NLP is the analysis of unstructured text to identify when specific project tasks are mentioned in text and to extract the requirements from the unstructured text. Relationship extraction is the performance of linguistic analysis by assigning text entities (such as people, locations, events, and organizations), and establishing relationships between these text entities. The tone analyzer analyzes the emotion portrayed in text. Speech to text converts the human voice into the written word. For example, speech to text services could transcribe conversations held at a meeting and NLP, relationship extraction, and tone analyzer services could analyze the transcription.

Figure 5:
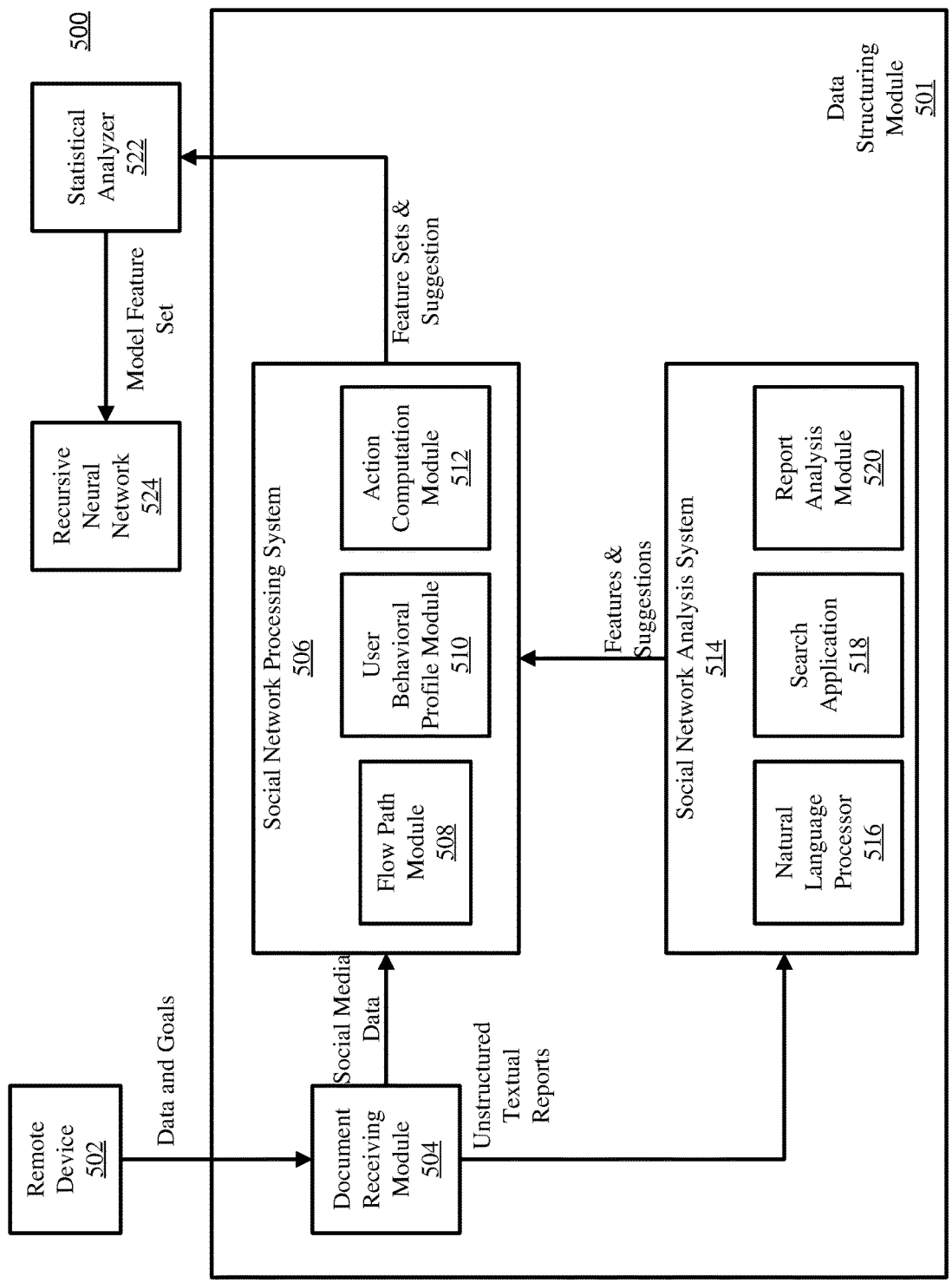
FIG. 5 depicts a block diagram in accordance with an exemplary embodiment of the present invention.

In an embodiment, referring to FIG. 5, shown is a block diagram of an example high level architecture of a system 500 for structuring unstructured textual and social network data, in accordance with embodiments of the present disclosure. In an embodiment, a data structuring module 501 and a statistical analyzer 522 includes the same characteristics as the data structuring module 320 and statistical analyzer 350 of FIG. 3, respectively. In an embodiment, a remote device 502 is substantially similar to one or more of the various data sources described in FIG. 3 and submits data to a document receiving module 504. The data includes one or more social media reports, social network reports, goals for the content, and one or more images or videos, such as social P2P information flow graphs. Document receiving module 504 is configured to receive the data and to send image(s) and video(s) to a social network processing system 506 and report(s) to a social network analysis system 514. In an embodiment, some reports (e.g., target user behavioral reports, skill level reports, etc.) contain both images and text. In an embodiment, document receiving module 504 is configured to parse the data to separate the images and text prior to sending the data to social network processing system 506 or to a social network analysis system 514.

In an embodiment, social network analysis system 514 includes the same modules and components as social network analysis system 412 (shown in FIG. 4). Social network analysis system 514 includes, e.g., a natural language processor 516, a search application 518, and a report analysis module 520. Social network analysis system 514 is configured to analyze the textual reports/data to identify one or more features and one or more suggestions relating to the feature(s). In an embodiment, after identifying a feature and a suggestion, social network analysis system 514 transmits the feature and suggestion to social network processing system 506. In an embodiment, social network analysis system 514 also transmits both the feature and the suggestion to statistical analyzer 522. Report analysis module 520 is substantially similar to report analysis module 430 of FIG. 4.

In an embodiment, social network processing system 506 includes, e.g., a flow path module 508, a user behavioral profile module 510, and an action computation module 512. Action computation module 512 is configured to receive, from social network analysis system 514, identified features & suggestions determined by analyzing one or more unstructured textual reports that are related to information received from document receiving module 504. In an embodiment, based on digital file formats (e.g., list of target user actions, image file formats, and video file formats), social network processing system 506 determines with which social media processing module (e.g., flow path module 508 or user behavioral profile module 510) the system should analyze the data received from document receiving module 504.

In an embodiment, flow path module 508 is configured to recognize, parse, and output structured data representations of hand-drawn and computer-generated computer diagrams, such as, for example, computer performance graphs, screen shots, or diagrams in social network actions or reactions. In an embodiment, flow path module 508 interprets, a relative probability of each action and the expected path length for each suggestion based on the target user information and the complexity of the suggestion based on relevant information (social media network relationships, connections, and actions of target user).

In an embodiment, user behavioral profile module 510 is configured to recognize social network action reports (i.e., what actions they have taken), or profile information and output structured data representations (e.g., machine-readable data) of computer system-related data therein. For example, user behavioral profile module 510 is configured to identify, from a still image, a video, or a single frame of a video feed, news feed, wall posts, features and/or suggestions represented in the still image, a video, or a single frame of a video feed, news feed, wall posts.

In an embodiment, action computation module 512 receives features and suggestions identified by report analysis module 520. Features and suggestions identified by report analysis module 520 are related to computer diagrams, images, screenshots or video processed by social network processing system 506. For example, a screenshot or video of a performance graph in a task manager window. In an embodiment, document receiving module 504 parses the screenshot or video and sends the unstructured text portion to social network analysis system 514 and the graphs to social network processing system 506. In an embodiment, portions of the data that do not need image processing are sent to statistical analyzer 522. Action computation module 512 is configured to receive the features and suggestions identified from the data with the features and suggestions identified from historical data or a machine learning system to ensure that a robust set of features and suggestions for the particular action selection are identified and grouped together.

After social network processing system 506 has analyzed any received structured data and social network analysis system 514 has analyzed any received unstructured reports for a given action, the complete feature set (e.g., all the feature sets related to a particular action) and suggestions are sent to statistical analyzer 522.

In an embodiment, as discussed herein, statistical analyzer 522 determines (e.g., using k-means or other statistical techniques) which features correlate to which suggestions. For example, if it is determined that action probability is below a certain threshold (e.g., below a certain level determined to be worth pursuing) for a particular action. As a result, statistical analyzer 522 could suggest that an alternative action or action variation with a higher probability in resulting in the desired goal or target user action.

After statistical analyzer 522 has digested a sufficient number of features and suggestions received from data structuring module 501 (e.g., the number of features and suggestions required for a robust and reliable action selection model, confidence values, and determining the detail level needed for each suggestion due to the action complexity), a model feature set is output to a recursive neural network 524. A model feature set includes features from a wide variety of actions and action suggestions for the actions. A model feature set is a static set of data, or it is dynamically updated "on-the-fly" as statistical analyzer 522 continuously receives additional features and suggestions from data structuring module 501.

In an embodiment, recursive neural network 524 is a multi-layer perceptron, a system of sigmoid neurons, a directed acyclic graph comprising a plurality of corelets, or any other structure/system capable of neural networking.

In an embodiment, recursive neural network 524 is used to conduct simulations of action selections wherein certain parameters of the simulation (e.g. certain features) are defined and/or manipulated by one or more users. Such simulations are used to determine that novel features (e.g., features not encountered or identified as part of suggested action variations from any reports from the various data sources) or uncommon features (e.g., features of action variations that are not usually suggested) are would be appropriate for a user or cluster of users.

In an embodiment, recursive neural network 524 utilizes the model feature set to analyze real-time input received from the sensors of the computer system and determine which suggestion is most likely to provide a solution to the issue. In an embodiment, recursive neural network 524 determines that no solution would sufficiently resolve the issue. For example, recursive neural network 524 could determine that the current system could not handle the requisite memory and determine that the system is not capable of performing with the requested performance metrics.

Figure 6:
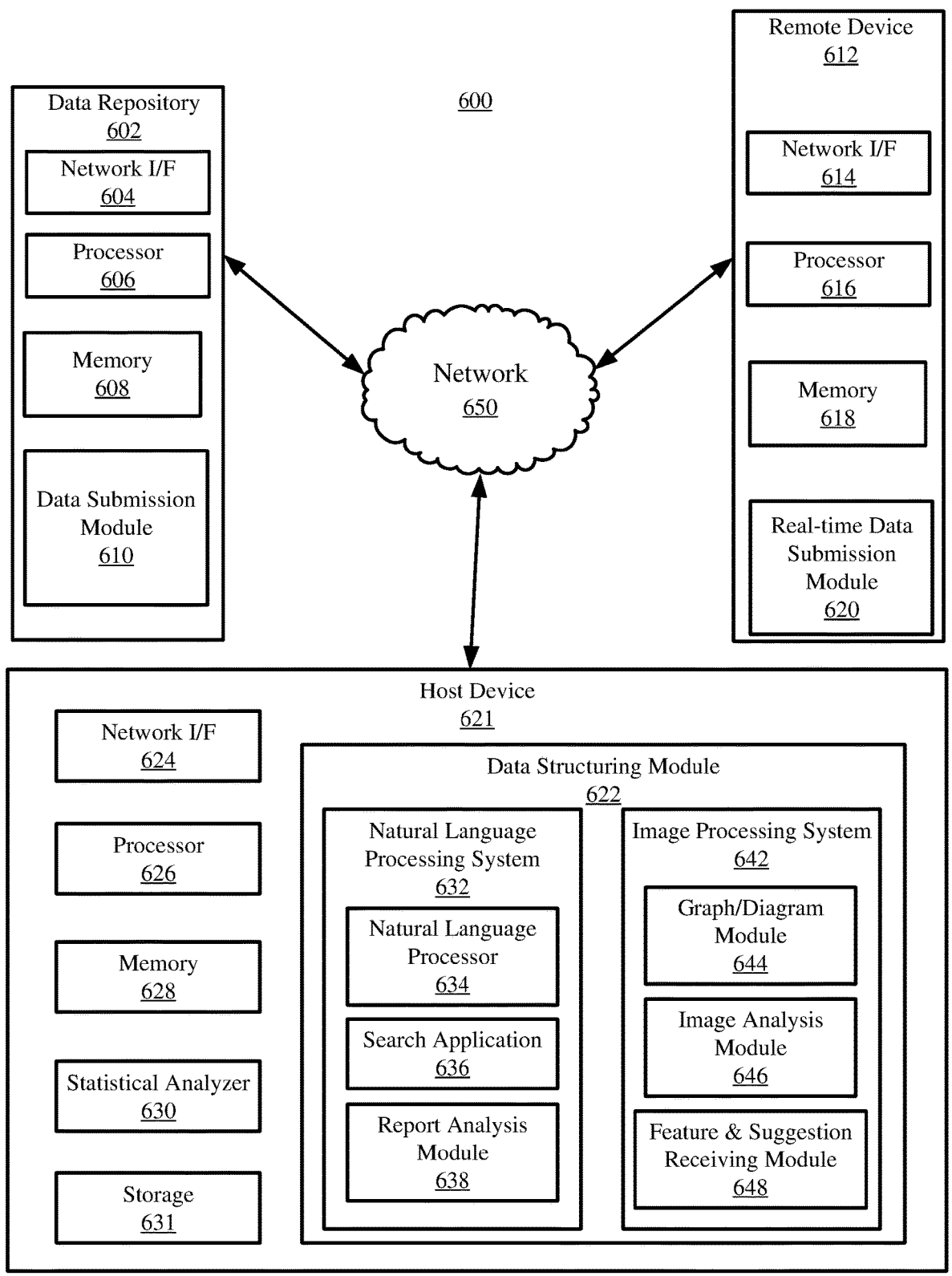
FIG. 6 depicts a computer environment diagram in accordance with an exemplary embodiment of the present invention.

Referring now to FIG. 6, illustrated is a block diagram of an example computing environment 600 for creating computer module models and employing them to select actions to present to a user, in accordance with embodiments of the present disclosure. Consistent with various embodiments, the host device 621, the data repository 602, and a remote device 612 include, or are, computer systems. The host device 621, the data repository 602, and remote device 612 each includes one or more processors 626, 606, and 616 and one or more memories 628 608, and 618, respectively. The host device 621, the data repository 602, and remote device 612 are configured to communicate with each other through an internal or external network interface 624 604, and 614. In an embodiment, network interfaces 624, 604, and 614 are, e.g., modems or network interface cards. In an embodiment, host device 621, the data repository 602, and remote device 612 is equipped with a display or monitor (not pictured). Additionally, in an embodiment, the host device 621, the data repository 602, and remote device 612 include optional input devices (e.g., a keyboard, mouse, controller, scanner, or other input device), and/or any commercially available or custom software (e.g., browser software, communications software, server software, speech recognition software, natural language processing software, search engine and/or web crawling software, filter modules for filtering content based upon predefined parameters, etc.). In an embodiment, the host device 621, the data repository 602, and remote device 612 include or are servers, desktops, laptops, or hand-held devices.

In an embodiment, host device 621, the data repository 602, and remote device 612 is distant from each other and communicate over a network 650. In an embodiment, the host device 621 is a central hub from which data repository 602 and remote device 612 can establish a communication connection, such as in a client-server networking model. Alternatively, the host device 621, the data repository 602, and remote device 612 are configured in any other suitable networking relationship (e.g., in a peer-to-peer configuration or using any other network topology).

In an embodiment, data repository 602 is substantially similar to any or all of the various data sources discussed in FIG. 3, data sources 424 of FIG. 4, or remote device 502 of FIG. 5. In an embodiment, data repository 602 submits data, using data submission module 610, via network 650 to host device 621. In an embodiment, host device 621 then generates a user play/use model to be used in determining the actions that remote device 612 will execute.

In an embodiment, remote device 612 enables users to submit (or submits automatically with or without user input) electronic data (e.g., real-time computer system status) to the host device 621 in order to identify real-time features to utilize in a user model for determining user behaviors for remote device 612. For example, remote device 612 includes real-time data submission module 620 and a user interface (UI). The UI is any type of interface (e.g., command line prompts, menu screens, graphical user interfaces). The UI allows a user to interact with the host device 621 to submit, using the real-time data submission module 620, real-time features to the host device 621.

In an embodiment, the host device 621 includes a data structuring module 622. Data structuring module 622 is substantially similar to data structuring module 320 of FIG. 3, or data structuring module 501 of FIG. 5.

In an embodiment, the data structuring module 622 includes cognitive analytic techniques. For example, the following cognitive analytic techniques could be used alone or in conjunction with others: natural language processing (NLP), relationship extraction, tone analyzer, and speech to text. For example, data structuring module could use a natural language processing system 632 including a natural language processor 634, a search application 636, and a report analysis module 638. Natural language processor 634 could include numerous subcomponents, such as a tokenizer, a part-of-speech (POS) tagger, a semantic relationship identifier, and a syntactic relationship identifier.

The search application 636 is implemented using a conventional or other search engine, and is distributed across multiple computer systems. The search application 636 is configured to search one or more databases, as described herein, or other computer systems for content that is related to an electronic document (such as a performance report) submitted by, or retrieved from, a data repository 602. For example, the search application 636 is configured to search dictionaries, catalogs, and/or archived target user behavioral reports to help identify one or more features, and suggestions associated with the features, relating to the action selection. The report analysis module 638 is configured to analyze a performance report to identify likely actions and a suggestion (e.g., actions presented to the user). In an embodiment, the report analysis module 638 includes one or more modules or units, and utilizes the search application 636, to perform its functions (e.g., to identify a feature and a suggestion), as discussed in more detail in reference to FIGS. 3-4.

In an embodiment, the data structuring module 622 includes an image processing system 642. In an embodiment, image processing system considers features and suggestions identified by natural language processing system 632 (e.g., features and suggestions received by feature & suggestion receiving module 748) or any other cognitive analytic technique when identifying features and suggestions from an data received or retrieved from data repository 602. In an embodiment, image processing system 642 utilizes one or more models, modules, or units to perform its functions (e.g., to analyze an image/video/diagram and identify feature sets and suggestions). For example, image processing system 642 could include one or more image processing modules that are configured to identify specific features and suggestions in a social network feed, wall post, social network action by a user, application use report, screen shot, recording of a display, etc. The image processing modules includes, by way of example, a graph diagram module 644 to analyze computer performance diagrams and graphs to identify features and suggestions. As another example, image processing system 642 includes an image analysis module 646 to identify features and suggestions from screen shots, videos, computer diagrams, and real time performance graphics. In an embodiment, the image processing modules are implemented as software modules. In an embodiment, graph diagram module 644 and image analysis module 646 are combined into a single software module or divided among the several components of the host device 621 or the data structuring module 622.

In an embodiment, image processing system 642 includes a feature & suggestion receiving module 648. The feature & suggestion receiving module 648 is substantially similar to action computation module 512 of FIG. 5.

In an embodiment, the host device 621 includes a statistical analyzer 630. The statistical analyzer 630 is configured to receive features and suggestions from cognitive analytic processing systems, such as natural language processing system 632, and an image analysis from image processing system 642 (e.g., the statistical analyzer 630 is substantially similar to the statistical analyzer 350 of FIG. 3).

In an embodiment, the data structuring module 622 has an optical character recognition (OCR) module (not pictured). In an embodiment, the OCR module is configured to receive an analog format of an unstructured textual report sent from a data repository 602 and perform optical character recognition (or a related process) on the report to convert it into machine-encoded text so that natural language processing system 632 performs natural language processing on the report. For example, the data repository 602 could transmit an image of a scanned user communication to the host device. The OCR module could convert the image into machine-encoded text, and then the converted report is sent to natural language processing system 632 for analysis. In an embodiment, the OCR module is a subcomponent of natural language processing system 632. In other embodiments, the OCR module is a standalone module within the host device 621 or data structuring module 622. In still other embodiments, the OCR module is located within the data repository 602 and performs OCR on the unstructured, analog textual reports before they are sent to the host device 621 or data structuring module 622.

In an embodiment, host device 621 further includes storage 631 for storing features, suggestions, and computer system module selection models. Computer system module selection models are loaded into active memory (e.g., memory 628 or memory 618) to process real-time input (e.g., data received from real-time data submission module 620) to determine a set of module suggestions that a remote device 612 should execute in light of real-time features (e.g., current memory usage).

While FIG. 6 illustrates a computing environment 600 with a single host device 621, a single data repository 602, and a single remote device 612, suitable computing environments for implementing embodiments of this disclosure includes any number of host devices, data repositories, and remote devices (such as a mobile phones). In an embodiment, the various models, modules, systems, and components discussed in relation to FIG. 6 exist, if at all, across a plurality of host devices, data repositories, and remote devices. For example, some embodiments include two host devices and multiple data repositories. The two host devices are communicatively coupled using any suitable communications connection (e.g., using a WAN, a LAN, a wired connection, an intranet, or the Internet). The first host device includes cognitive analytic processing systems, such as a natural language processing system, configured to receive and analyze data (such as unstructured textual reports), and the second host device includes an image processing system configured to receive and analyze diagrams, images, or screenshots.

In an embodiment, it is noted that FIG. 6 is intended to depict the representative major components of an exemplary computing environment 600. In an embodiment, however, individual components have greater or lesser complexity than as represented in FIG. 6, components other than or in addition to those shown in FIG. 6 are present, and the number, type, and configuration of such components may vary.

Computer System

Figure 7:
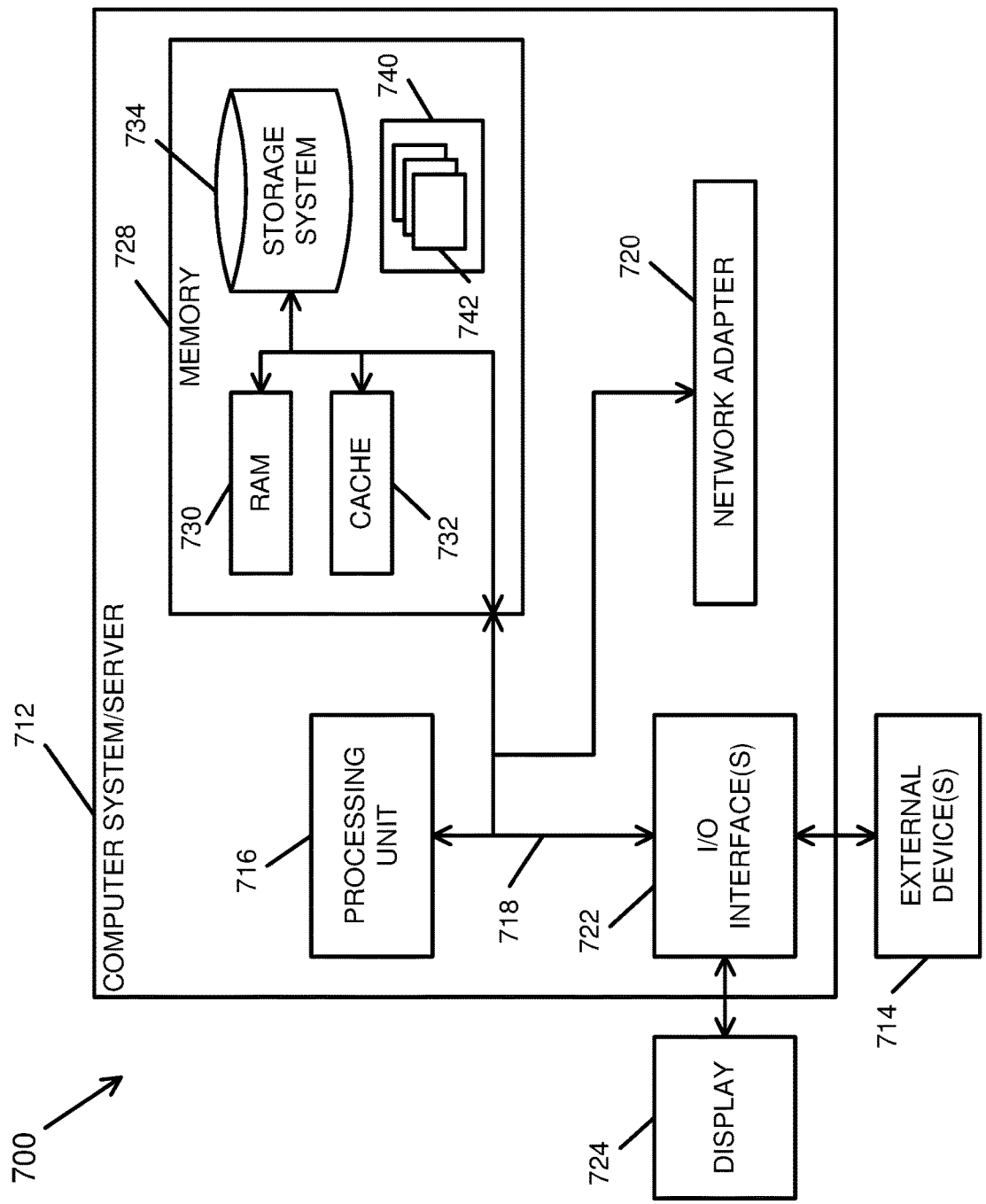
FIG. 7 depicts a computer system in accordance with an exemplary embodiment of the present invention.

In an exemplary embodiment, the computer system is a computer system 900 as shown in FIG. 7. Computer system 700 is only one example of a computer system and is not intended to suggest any limitation as to the scope of use or functionality of embodiments of the present invention. Regardless, computer system 700 is capable of being implemented to perform and/or performing any of the functionality/operations of the present invention.

Computer system 700 includes a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 712 may be described in the general context of computer system-executable instructions, such as program modules, being executed by a computer system. Generally, program modules may include routines, programs, objects, components, logic, and/or data structures that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computer system 700 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions/operations of embodiments of the invention.

Program/utility 740, having a set (at least one) of program modules 742, may be stored in memory 728 by way of example, and not limitation. Exemplary program modules 742 may include an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the present invention.

Computer system/server 712 may also communicate with one or more external devices 714 such as a keyboard, a pointing device, a display 724, one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
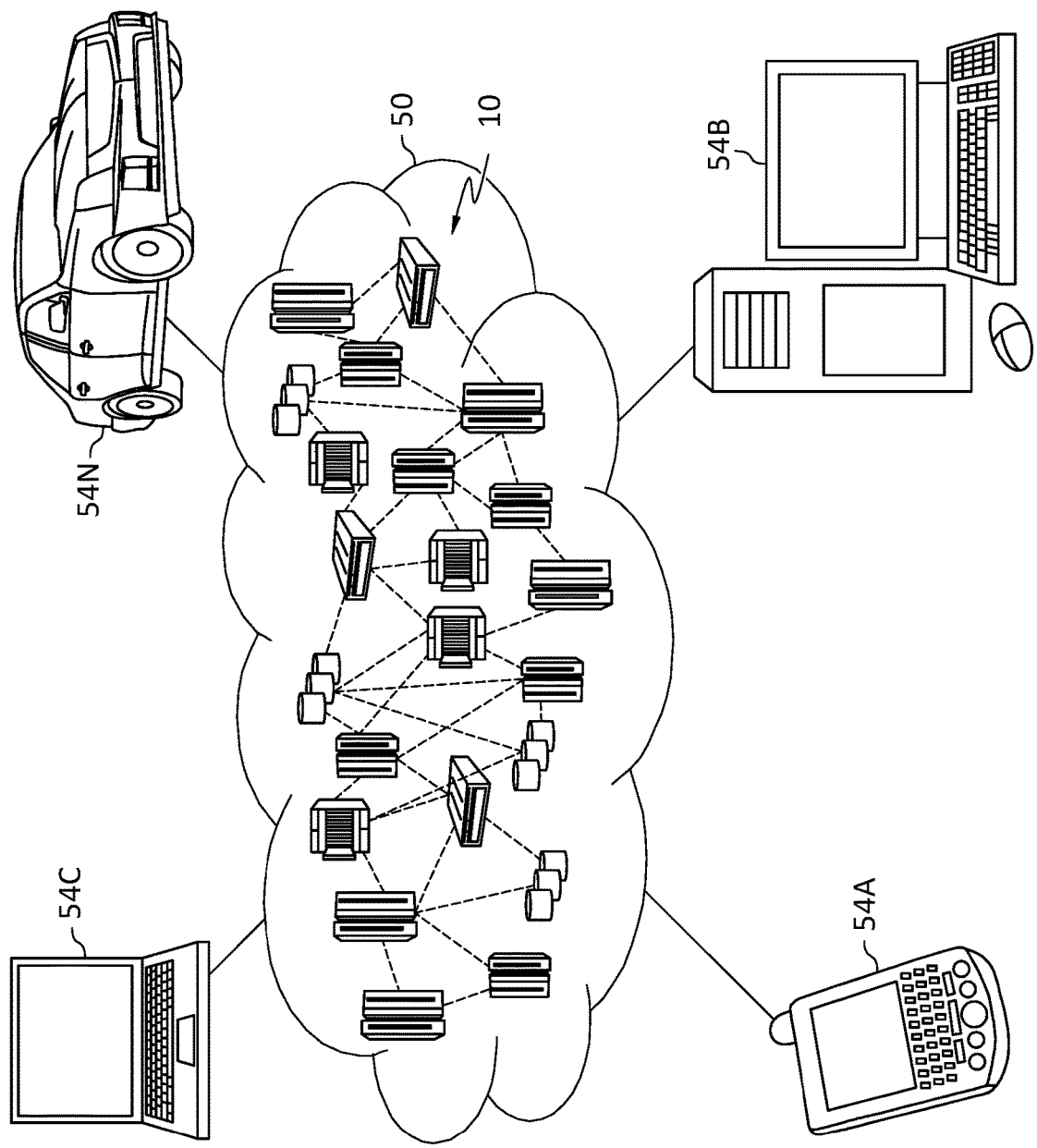
FIG. 8 depicts a cloud computing environment according to various embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
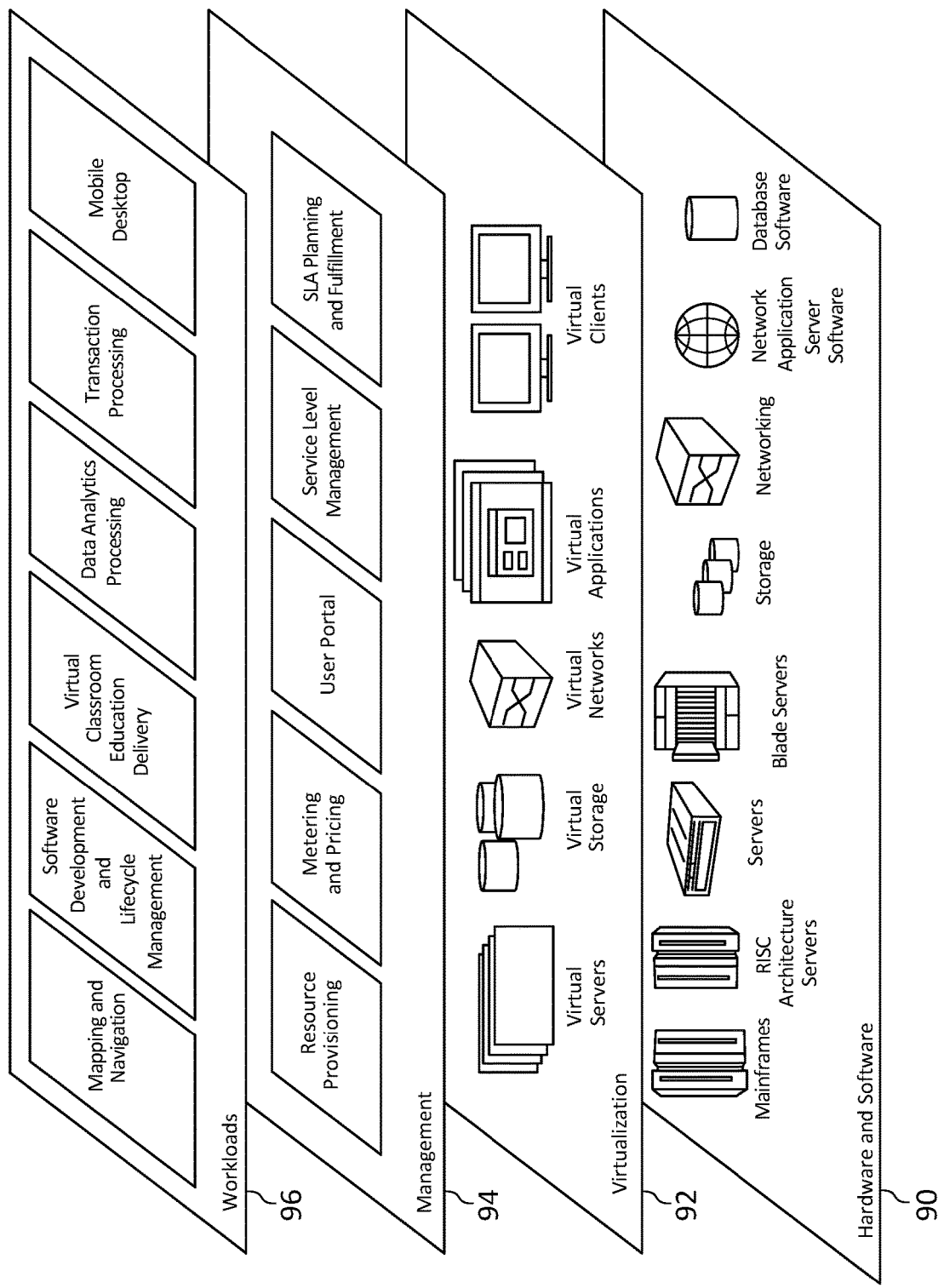
FIG. 9 depicts abstraction model layers according to various embodiments of the present invention.

Referring now to FIG. 9, a set of functional abstraction layers provided by cloud computing environment 50 (FIG. 10) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 90 includes hardware and software components. Examples of hardware components include: mainframes; RISC (Reduced Instruction Set Computer) architecture based servers; storage devices; networks and networking components. In some embodiments, software components include network application server software.

Virtualization layer 92 provides an abstraction layer from which the following examples of virtual entities may be provided: virtual servers; virtual storage; virtual networks, including virtual private networks; virtual applications and operating systems; and virtual clients.

In one example, management layer 94 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 96 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

What is claimed is:

1. A computer implemented method comprising:
   receiving, by a computer system, target user identification data identifying a target user, target action data, social network content for one or more users, and social network activity data for the one or more users;
   training a recursive neural network by digesting the target user identification data to infer behavioral models, the target action data, the social network content for the one or more users, and the social network activity data for the one or more users, wherein some social network activity results in a target action and some social network activity does not result in the target action;
   simulating, by the computer system with the recursive neural network using the behavioral models, social network links between a source user and the target user and the social network activity data for the one or more users;
   determining, by the computer system using the recursive neural network with the behavioral models, a prioritized list of a series of action sequences with respective projected path lengths for the target user performing the target action on the content, based on the links between the source user and the target user and the social network activity data for the one or more users;
   displaying, to the source user on a display connected to the computer system, the prioritized list of action sequences with a probability of reaching a target reaction;
   receiving a performance report for the prioritized list of action sequences;
   outputting, by a statistical analyzer connected to the computer system, the performance report and the prioritized list of action sequences, to the recursive neural network;
   receiving target action time data for each action sequence;
   identifying a target action time for the one or more action sequences for the target action to occur, based on a probability of reaching a goal and a path progress;
   simulating, by the computer system using the recursive neural network, action selections to determine new features not encountered or identified as part of received data;
   simulating, by the computer system using the recursive neural network, a performance for the new features based on the target action time; and
   updating the display with a progress of the probability for the new features and the target action time as the source user enacts the action sequences.

2. The method of claim 1 wherein the prioritized list is prioritized by at least one of minimal path length probability, strength of network connection, and history of similar actions by the target user.

3. The method of claim 1 further comprising:
   monitoring, by the computer system, a status of a selected action path; and
   reporting, by the computer system, the status of the selected action path.

4. The method of claim 3 further comprising:
   based on the monitoring, determining, by the computer system, an updated prioritized list of probabilistic action paths that could result in the target user performing the target action on the content based on the analyzing and the receiving; and
   outputting the updated prioritized list to the source user via a screen logically connected to the computer system.

5. The method of claim 1, further comprising, assigning, by the computer system, a probability value for each action path in the prioritized list.

6. The method of claim 1, wherein one or more of the action paths is comprised of multiple actions by the source user.

7. The method of claim 1, wherein the performance report includes a probability value for each action sequence in the prioritized list.

8. The method of claim 1, further comprising:
   filtering out, based on the determining, an action sequence that has a path length outside of a maximum path length, wherein the filtered out action sequence is not displayed in the prioritized list of action sequences.

9. A system comprising:
   a memory; and
   a processor in communication with the memory, the processor configured to perform a method comprising:
   receive, by a computer system, target user identification data identifying a target user, target action data, social network content for one or more users, and social network activity data for the one or more users;
   training a recursive neural network by digesting the target user identification data to infer behavioral models, the target action data, the social network content for the one or more users, and the social network activity data for the one or more users, wherein some social network activity results in a target action and some social network activity does not result in the target action;

simulating, by the computer system, with the recursive neural network using the behavioral models social network links between a source user and the target user and the social network activity data for the one or more users;

determine, by the computer system using the recursive neural network with the behavioral models, a prioritized list of a series of action sequences with respective projected path lengths for the target user performing the target action on the content, based on the links between the source user and the target user and the social network activity data for the one or more users;

displaying, to the source user on a display connected to the computer system, the prioritized list of action sequences with a probability of reaching a target reaction, receive, by the computer system, a performance report for the prioritized list of action sequences;

receiving target action time data for each action sequence;

identifying a target action time for the one or more action sequences for the target action to occur, based on a probability of reaching a goal and a path progress;

output, by a statistical analyzer connected to the computer system, the performance report and the prioritized list of action sequences, to a recursive neural network, simulate, by the computer system using the recursive neural network, action selections to determine new features not encountered or identified as part of received data;

simulate, by the computer system using the recursive neural network, a performance for the new features based on the target action time; and updating the display with a progress of the probability for the new features and the target action time as the source user enacts the action sequences.

10. The system of claim 9, wherein the prioritized list is prioritized by at least one of minimal path length probability, strength of network connection, and history of similar actions by the target user.

11. The system of claim 9 further comprising:
monitoring, by the computer system, a status of a selected action path; and
reporting, by the computer system, the status of the selected action path.

12. The system of claim 11 further comprising:
based on the monitoring, determining, by the computer system, an updated prioritized list of probabilistic action paths that could result in the target user performing the target action on the content based on the analyzing and the receiving; and
outputting the updated prioritized list to the source user via a screen logically connected to the computer system.

13. The system of claim 9, further comprising, assigning, by the computer system, a probability value for each action path in the prioritized list.

14. The system of claim 9, wherein one or more of the action paths is comprised of multiple actions by the source user.

15. A computer program product comprising a computer readable storage medium having program instructions embodied therewith, the program instructions executable by a processor to cause the processor to perform a method comprising:

receiving, by a computer system, target user identification data identifying a target user, target action data, social network content for one or more users, and social network activity data for the one or more users;

training a recursive neural network by digesting the target user identification data to infer behavioral models, the target action data, the social network content for the one or more users, and the social network activity data for the one or more users, wherein some social network activity results in a target action and some social network activity does not result in the target action;

simulating, by the computer system with the recursive neural network using the behavioral models, social network links between a source user and the target user and the social network activity data for the one or more users;

determining, by the computer system using the recursive neural network with the behavioral models, a prioritized list of a series of action sequences with respective projected path lengths for the target user performing the target action on the content, based on the links between the source user and the target user and the social network activity data for the one or more users;

displaying, to the source user on a display connected to the computer system, the prioritized list of action sequences with a probability of reaching a target reaction;

receiving, by the computer system, a performance report for the prioritized list of action sequences;

outputting, by a statistical analyzer connected to the computer system, the performance report and the prioritized list of action sequences, to a recursive neural network, receiving target action time data for each action sequence;

identifying a target action time for the one or more action sequences for the target action to occur, based on a probability of reaching a goal and a path progress;

simulating, by the computer system using the recursive neural network, action selections to determine new features not encountered or identified as part of received data;

simulating, by the computer system using the recursive neural network, a performance for the new features based on the target action time; and updating the display with a progress of the probability for the new features and the target action time as the source user enacts the action sequences.

16. The computer program product of claim 15, wherein the prioritized list is prioritized by at least one of minimal path length probability, strength of network connection, and history of similar actions by the target user.

* * * * *